April 20, 1948.  E. B. HALLMAN  2,440,011
COMBINED VEHICLE STOP AND DIRECTIONAL SIGNAL
Filed Aug. 24, 1945  2 Sheets-Sheet 1
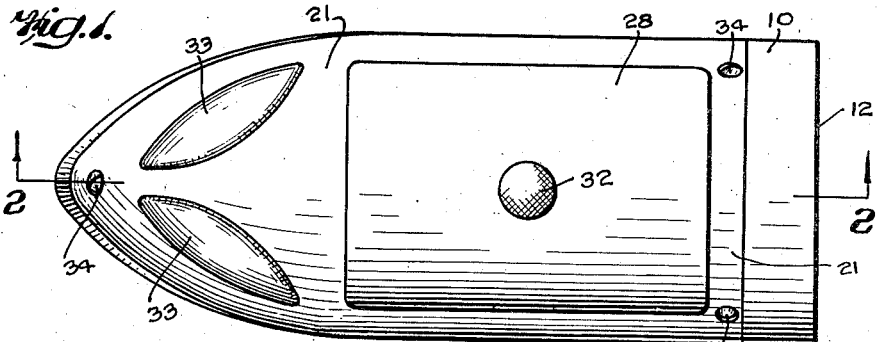
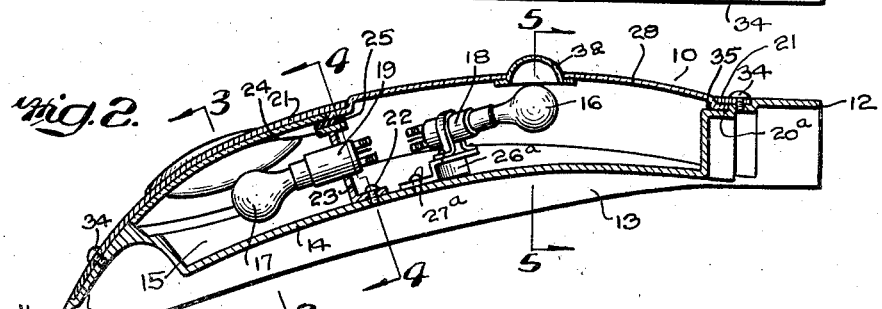
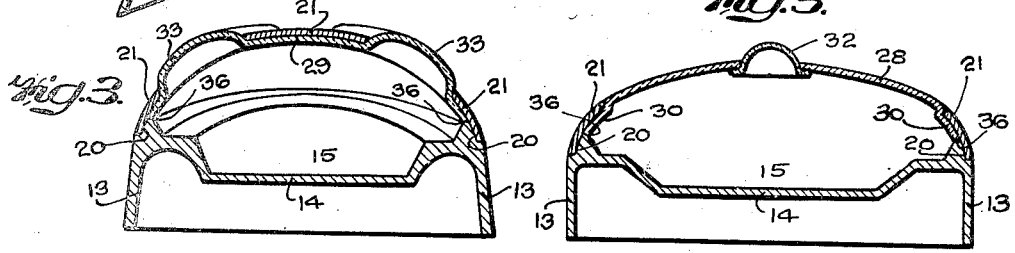
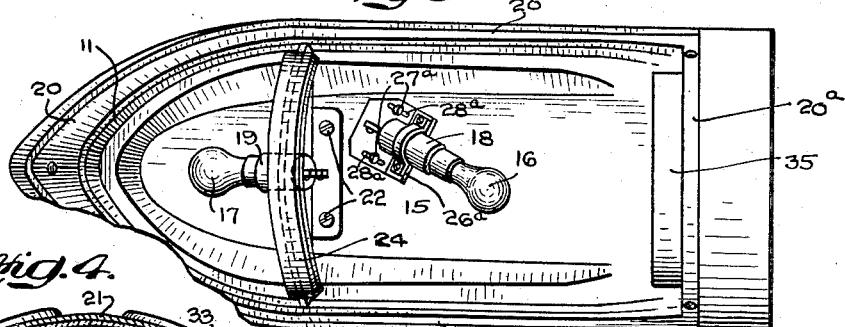
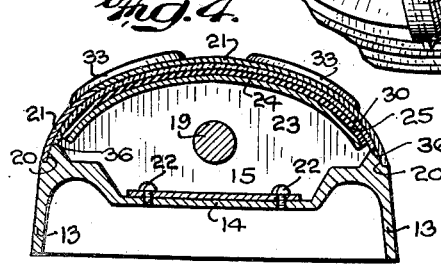
INVENTOR.
ERIC B. HALLMAN
BY
Leon Edelson
ATTORNEY.

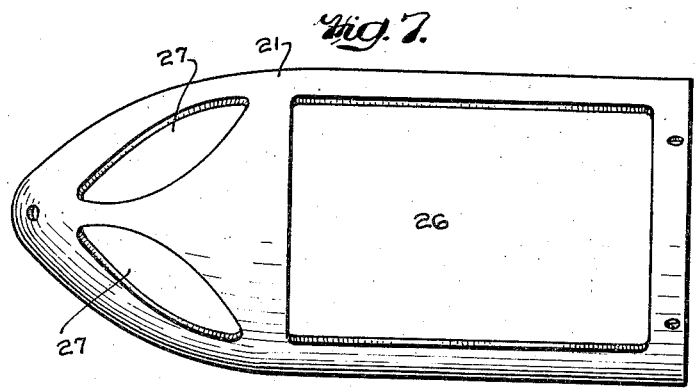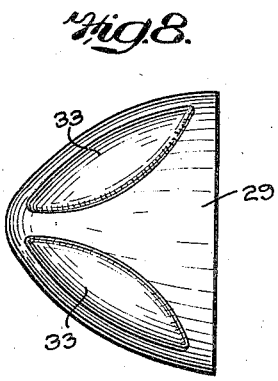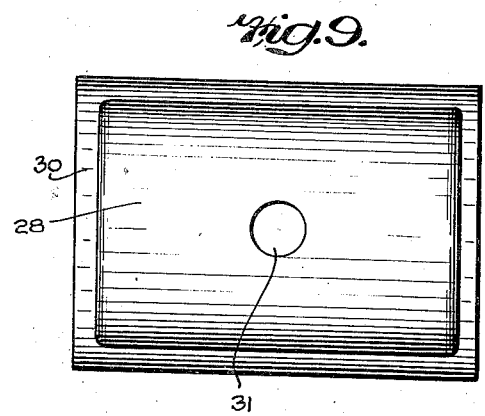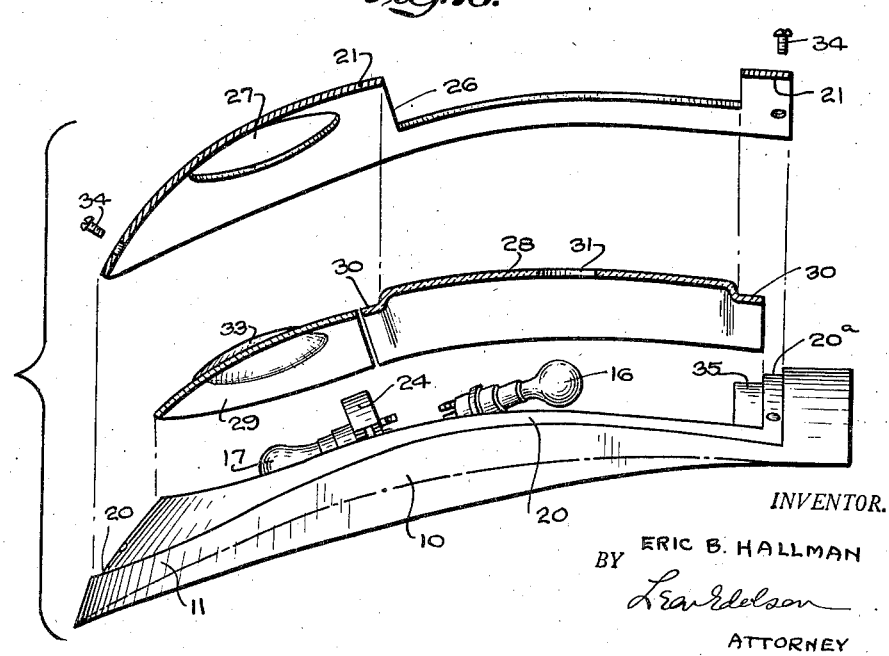

Patented Apr. 20, 1948

2,440,011

UNITED STATES PATENT OFFICE 2,440,011

COMBINED VEHICLE STOP AND DIRECTIONAL SIGNAL

Eric B. Hallman, Philadelphia, Pa., assignor to Electric Service Manufacturing Company, Philadelphia, Pa., a corporation of Pennsylvania Application August 24, 1945, Serial No. 612,368

6 Claims. (Cl. 177—329)

This invention relates generally to auxiliary lamps and more particularly to an improved construction of an electrically illuminated signalling lamp which is adapted to be mounted upon the front and rear of automotive vehicles.

Among the principal objects of the present invention is to provide a signal lamp unit of simple and inexpensive construction and of such design that it may be readily adapted to the surface contour of the vehicle body upon which it is mounted, the unit being provided with a mounting base of such standard construction that it may be attached either to the front or to the rear body portion of the vehicle.

A further object is to provide a signal lamp unit designed to be internally fitted with both stop and direction-indicating lamps, and with an external cover plate of opaque material fitted with light-transmitting panels of such relative shape and disposition as to produce the effect of a directional arrow when the lamps are lit.

Other objects and advantages of the invention will appear more fully hereinafter, it being understood that the present invention consists substantially in the combination, construction, location and relative arrangement of parts, all as will be described in detail hereinafter, as shown in the accompanying drawings and as finally pointed out in the appended claims.

In the accompanying drawings,

Figure 1 is a plan view of the lighting unit of the present invention;

Figure 2 is a longitudinal sectional view thereof taken on the line 2—2 of Figure 1;

Figure 3 is a transverse sectional view taken on the line 3—3 of Figure 2;

Figure 4 is a transverse sectional view taken on the line 4—4 of Figure 2;

Figure 5 is a transverse sectional view taken on the line 5—5 of Figure 2;

Figure 6 is a plan view of the unit with the cover thereof removed;

Figure 7 is a plan view of the opaque cover member;

Figures 8 and 9 are views, respectively, of the light-transmitting panels of the cover member; and Figure 10 is an exploded view showing the several elements of the lighting unit.

Referring now more particularly to the drawings, it will be observed that the lighting unit of the present invention comprises a main base member 10 of the shape and contour shown in the several figures, said base member being of generally elongated form having parallel sides which converge to provide a pointed forward end portion 11, the rear edge 12 of the unit being generally square to the parallel side edges thereof. As appears most clearly in Figure 2, the base member 10 is curved longitudinally to correspond to the curvature of the vehicle body to which it is adapted to be secured, it being important to note in this connection that the opposite longitudinally extending sides of the member are respectively provided with relatively deep flanges 13—13, the free edges of which are curved to the contour of the vehicle body surface. By grinding or otherwise finishing these free edges of the side flanges 13—13, the contour thereof may be varied as desired, as indicated by the dot and dash lines of Figure 10, to snugly fit the base to the exact curvature of the body to which the unit is designed to be attached.

The base member 10 is centrally depressed, as at 14, to provide a well 15 within which are disposed the combination tail and stop double-filament lamp 16 and the direction indicating lamp 17, each of these lamps being supported in conventional manner within their respective lamp sockets 18 and 19. The depth of the well 15 is such that the lamps 16 and 17 are normally disposed well below the curved outer plane of the base member, at the same time that the floor 14 of the well is located sufficiently above the bottom plane of the free edges of the side flanges 13—13 as to provide for grinding off of said edges to vary the contour thereof without interference by the bottom of the lamp well.

The base member 10 is marginally provided with a shouldered seat 20, this seat being adapted to receive a top cover member 21 of the form shown most clearly in Figures 7 and 10. Preferably, this top cover member is in the form of a sheet metal stamping, although it may be formed of any other opaque material. This top cover 21 is curved both longitudinally and transversely, with the front edge thereof converging to form a pointed nose which corresponds in shape with that of the front end portion 11 of the base member. As in the case of the base member, the rear end of the top cover member 21 extends squarely across the parallel side edges thereof for engagement with the rear portion 20a of the marginal shoulder 20 formed in the base member. The design and construction of the top cover member 21 in relation to its shouldered seat 20—20a in the base member is such that when said base member 10 and top cover member 21 are assembled, as shown in Figures 2 to 4 inclusive, the external surface of the top cover member is flush with the surrounding external surface of its supporting base member.

Suitably secured within the lamp-receiving well 15 of the base member, as by the screws 22, is a partition member 23. This partition member 23 extends transversely across the full width of the well 15 and is transversely curved along its upper edge in correspondence with its transverse curvature of the top covering member 21. Preferably, the upper edge of the transverse partition 23 is provided with a flat rim 24 which serves as a broadened support for a resilient gasket 25 disposed intermediate the partition member 23 and the top cover assembly.

The stop lamp socket 18 is supported in any suitable manner upon a bracket 26a which is adjustably secured to the floor 14 of the lamp-receiving well by means of the screws 27a projected through elongated slots 28a formed in the base of the bracket. Thus, the bracket is adjustable in a direction extending axially of the lamp socket 18 so as to provide for positional adjustment of the lamp filament. The lamp socket 19, which receives the direction indicating lamp 17, is fixedly mounted in the transverse partition 23 so as to present the lamp 17 forwardly of the partition 23, the lamp 17 being thus confined within a chamber separate and distinct from that containing the stop and tail lamp 16.

The top cover member 21, as most clearly appears in Figure 7, is provided in its rear portion with a rectangular opening 26 of such substantial size that it is practically coextensive in area with that of the rear compartment in which is housed the lamp 16. The tapered front end portion of the cover member 21 is provided with a pair of oval shaped openings 27—27, which are so arranged relatively to each other that their major axes are divergent rearwardly of the cover. The forward extremities of these openings 27—27 are rather closely disposed between each other, as shown, so that these openings relatively occupy the positions of a pair of barbs on an arrow.

In addition to the parts hereinbefore described, the unit of the present invention includes a pair of light transmitting panels 28 and 29 formed of any suitable translucent or transparent material such as glass, plastic or the like. The panel 28 is of generally rectangular form and is curved both longitudinally and transversely to correspond with the contour of the cover member 21, the marginal edges thereof being depressed as at 30 to provide a marginal flange which is adapted to underlie the member 21 throughout all of the portion thereof which marginally surrounds the opening 26. The central portion of the member 28 thus constitutes, in effect, a window for the rear portion of the cover member 21 disposed above the compartment in which is housed the lamp 16. If desired, the member 28 may be centrally apertured, as at 31, to receive a jewel or similar light transmitting element 32 for transmitting therethrough the light rays of the lamp 16 when the latter is operated in normal manner as a tail light. When, however, the lamp 16 is operated as a stop light, light rays of greater intensity are projected therefrom to brightly illuminate not only the jewel 32 but also all of the area of the panel 28.

The second light transmitting panel 29 is generally of the triangular or semi-oval shape shown in Figure 8 to fit beneath the pointed front end portion of the opaque top cover member 21. This panel 29, which is also formed of any suitable transparent or translucent material, such as glass, plastic or the like, is provided with a pair of bulbous elements 33—33 each of generally elliptical form and relatively arranged to correspond in position with the openings 27—27 of the cover member 21. The bulbous portions 33—33 thus project respectively through the openings 27—27 and provide light transmitting windows therefor through which may be transmitted the light rays emanating from the direction indicating lamp 17. As most clearly appears in Figure 2, the rear edge of the member 29 abuts the front edge of the member 28 along a line disposed in the vertical plane of the partition member 23, both of these abutting edge portions being thus securely clamped in position between the gasket 25 and the overlying cover member 21. At the same time, the rear marginal flange 30 of the member 28 is clamped between the cover member 21 and the depressed seat 35 formed in the base member 10, with the side edges of the panel members 28 and 29 in abutting engagement with base 10, as shown at 36 in Figures 3, 4 and 5. The latter is securely held in position upon the base member 10 by means of the securing screws 34.

In use, the unit of the present invention is preferably employed in pairs both at the rear end and at the front ends of the vehicle. When so employed in pairs, one unit of each pair is located at either side of the vehicle with its pointed end facing outwardly and away from the center of the vehicle. Upon energizing the lamp 17, the light transmitting windows 33—33 are illuminated and because of their relative shape and disposition they simulate the head of an arrow to indicate the direction in which the vehicle is to turn or be maneuvered. The direction-indicating character of the illuminated elements 33—33 is considerably enhanced at night when the combination stop and tail lamp 16 is lit due to the fact that the illuminated panel 28 serves as a tail for the directional arrow. The jewel 32 is normally employed only in the case of the rear-mounted units, the lamps 16 of the units mounted upon the front of the vehicle being of the single-filament type instead of the double-filament type conventionally employed in combination stop and tail light signalling devices.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. A signalling device for automotive vehicles comprising a main base member of generally elongated form having its forward end tapered to form a pointed extremity, said base member being provided at opposite sides thereof with freely extending flanges the edges of which are adapted to be shaped to the contour of the surface upon which the device is to be mounted, said base member being further provided with a lamp-receiving well having a closed bottom wall spaced inwardly of the plane of the edges of said flanges, a transverse partition dividing said well into a pair of separate lamp compartments, light transmitting panels respectively disposed in covering relation to said compartments, and an opaque retaining plate removably mounted upon said base member for marginally securing said panels in light-transmitting position, said retaining plate being provided with openings therein in respective registry with said light transmitting panels whereby to expose the latter for the transmission of light therethrough.

2. In a signalling device of the character defined in claim 1 wherein said retaining plate is provided in the rear portion thereof with a relatively large opening to form a marginal frame for one of said light transmitting panels and in the front portion thereof with a pair of angularly related oval-shaped openings overlying the other of said light transmitting panels whereby to obtain the effect of a double-headed direction-indicating arrow upon the transmission of light through said oval-shaped openings.

3. In a signalling device of the character defined in claim 1 wherein the forward end of said retaining plate is tapered in correspondence with that of the base member and wherein said plate is secured to the base member with its marginal edges substantially flush with the surrounding surfaces of the base member, said forward end portion of the retaining plate being provided with a pair of oval-shaped openings so angularly related that their major axes are rearwardly divergent with respect to the median plane of the base member, one of said light transmitting panels being fitted beneath said tapered portion of the retaining plate and being provided with a pair of bulbous projections respectively fitting within said angularly related openings.

4. In a signalling device of the character defined in claim 1 wherein said base member and its associated retaining plate for the light transmitting panels are longitudinally curved rearwardly of the forward pointed extremity of the device, and wherein said retaining plate is transversely arched from side to side thereof.

5. A signalling device for automotive vehicles comprising a main base member having a lamp-receiving well formed centrally therein, a transversely extending partition member for dividing said well into a pair of separate lamp-receiving compartments, said partition member being provided along its upper edge with a relatively wide rim, a pair of light transmitting panels respectively disposed in covering relation to said compartments with the adjoining edges thereof commonly resting upon said rim, and a retaining plate for said panels secured to said base member and adapted to clamp said adjoining edges of the panels against said rim, said retaining plate having openings through which portions of said panels are exposed, certain of said openings being of such shape and relative disposition as to provide the effect of a double-headed arrow upon the transmission of light through said panels.

6. In a signalling device of the character defined in claim 5 wherein said base member is provided at opposite sides thereof with supporting flanges of such depth that their free edges are disposed in a plane spaced from the bottom wall of said lamp-receiving well, whereby said flanges may be reduced in depth and the curvature of their free edges altered to accommodate the device to supporting surfaces of varying contours.

ERIC B. HALLMAN.

REFERENCES CITED

The following references are of record in the file of this patent:

UNITED STATES PATENTS

| Number | Name | Date |
| --- | --- | --- |
| 1,517,133 | Van Bloem | Nov. 25, 1924 |
| 1,537,288 | Beam | May 12, 1925 |
| 2,221,178 | Best | Nov. 12, 1940 |
| 2,231,429 | Simmons | Feb. 11, 1941 |